United States Patent
Sano

(10) Patent No.: US 7,891,151 B2
(45) Date of Patent: Feb. 22, 2011

(54) FASTENERS FOR CLAMPING SHEET-FORM MEMBERS, AND APPARATUS AND METHOD USING SUCH FASTENERS TO ATTACH UNDERCOVER ONTO UNDERSIDE OF VEHICLE FLOOR PANEL

(75) Inventor: Takahiro Sano, Toyohashi (JP)

(73) Assignee: Newfrey LLC, Newark, DE (US)

( * ) Notice: Subject to any disclaimer, the term of this patent is extended or adjusted under 35 U.S.C. 154(b) by 476 days.

(21) Appl. No.: 11/739,353

(22) Filed: Apr. 24, 2007

(65) Prior Publication Data

US 2007/0248436 A1 Oct. 25, 2007

(30) Foreign Application Priority Data

Apr. 24, 2006 (JP) .............................. 2006-118725

(51) Int. Cl.
*E04B 5/00* (2006.01)
(52) U.S. Cl. .................. 52/506.05; 411/338; 296/97.23
(58) Field of Classification Search .................. 411/89,
411/102–103, 107, 160–162, 171, 184–188,
411/338, 347, 349, 433, 437, 510, 933; 24/297,
24/543; 52/506.05, 716.4, 716.6, 704, 708,
52/713
See application file for complete search history.

(56) References Cited

U.S. PATENT DOCUMENTS

| 775,728 | A | * | 11/1904 | Miller | ........................ 411/365 |
| 986,510 | A | * | 3/1911 | Scott | ......................... 411/186 |
| 1,235,184 | A | * | 7/1917 | Casbarian | ............... 174/152 G |
| 1,431,674 | A | * | 10/1922 | MacGill, Jr. | ................ 411/338 |
| 1,931,649 | A | * | 10/1933 | Eger | ......................... 152/427 |
| 2,560,961 | A | | 7/1951 | Knohl | |
| 3,019,865 | A | * | 2/1962 | Rohe | ....................... 52/787.12 |
| 3,037,542 | A | * | 6/1962 | Boyd | ......................... 411/105 |
| 3,120,254 | A | * | 2/1964 | Waltermire et al. | ......... 411/188 |
| 3,227,029 | A | * | 1/1966 | Devine et al. | ............... 411/337 |
| 3,389,736 | A | * | 6/1968 | Gulistan | ..................... 411/361 |
| 3,404,716 | A | * | 10/1968 | Cosenza | ..................... 411/105 |

(Continued)

FOREIGN PATENT DOCUMENTS

DE 196 30 249 2/1997

(Continued)

OTHER PUBLICATIONS

European Search Report dated Nov. 26, 2008 cited in corresponding EP Application No. 07 10 6747.

*Primary Examiner*—Victor Batson
*Assistant Examiner*—Roberta Delisle
(74) *Attorney, Agent, or Firm*—Michael P. Leary

(57) ABSTRACT

Two-clip tubular fasteners are used to clamp a sheet-like member between flanges of the clips. An apparatus and method for attaching an undercover to the underside of a vehicle floor panel having a plurality of studs comprises a plurality of the tubular fasteners that are inserted into respective mounting holes of the undercover and that are engaged with the studs. At least some of the mounting holes provide diametral clearance with respect to corresponding tubular fasteners. The flanges of those fasteners exert a predetermined clamping force on the undercover while permitting planar movement of the undercover. One of the flanges has a configuration that engages a cooperable configuration on the undercover to prevent undesired turning of a first clip relative to a second clip.

7 Claims, 8 Drawing Sheets

U.S. PATENT DOCUMENTS

| | | | | |
|---|---|---|---|---|
| 3,618,443 | A | * | 11/1971 | Fitzner ......................... 411/352 |
| 3,728,761 | A | * | 4/1973 | Holly ......................... 411/80.1 |
| 4,286,642 | A | | 9/1981 | Keatley |
| 4,577,450 | A | | 3/1986 | Large |
| 4,579,493 | A | * | 4/1986 | Schaty ......................... 411/510 |
| 4,659,273 | A | * | 4/1987 | Dudley ......................... 411/373 |
| 4,729,706 | A | | 3/1988 | Peterson et al. |
| 4,755,090 | A | | 7/1988 | Macfee, Jr. et al. |
| 4,828,444 | A | * | 5/1989 | Oshida ......................... 411/437 |
| 4,830,560 | A | * | 5/1989 | Hirohata ......................... 411/433 |
| 4,837,942 | A | | 6/1989 | Watts |
| 4,848,089 | A | | 7/1989 | Cramer |
| 4,850,778 | A | * | 7/1989 | Clough et al. ............... 411/433 |
| 4,878,792 | A | * | 11/1989 | Frano ......................... 411/339 |
| 4,897,005 | A | | 1/1990 | Peterson et al. |
| 4,954,032 | A | * | 9/1990 | Morales ......................... 411/289 |
| 4,973,102 | A | | 11/1990 | Bien |
| 5,039,264 | A | | 8/1991 | Benn |
| 5,076,747 | A | * | 12/1991 | Cosenza ......................... 411/353 |
| 5,098,242 | A | * | 3/1992 | Schaty ......................... 411/437 |
| 5,168,604 | A | | 12/1992 | Boville |
| 5,197,840 | A | * | 3/1993 | Peek ......................... 411/433 |
| 5,302,070 | A | * | 4/1994 | Kameyama et al. ......... 411/437 |
| 5,332,347 | A | * | 7/1994 | Kimisawa ................... 411/182 |
| 5,373,611 | A | | 12/1994 | Murata |
| 5,465,928 | A | | 11/1995 | Massie |
| 5,507,545 | A | | 4/1996 | Krysiak |
| 5,513,893 | A | | 5/1996 | Nakata et al. |
| 5,533,781 | A | | 7/1996 | Williams |
| 5,567,098 | A | | 10/1996 | Gordon |
| 5,599,148 | A | | 2/1997 | Hirose |
| 5,632,584 | A | | 5/1997 | Acevedo |
| 5,651,632 | A | * | 7/1997 | Gordon ......................... 403/319 |
| 5,660,513 | A | * | 8/1997 | Shibanushi ................. 411/433 |
| 5,674,023 | A | | 10/1997 | Williams |
| 5,707,192 | A | | 1/1998 | Vortriede et al. |
| 5,711,645 | A | * | 1/1998 | Sanbonmatsu et al. ...... 411/270 |
| 5,795,118 | A | * | 8/1998 | Osada et al. ................. 411/171 |
| 5,816,762 | A | * | 10/1998 | Miura et al. ................. 411/433 |
| 5,879,115 | A | * | 3/1999 | Medal ......................... 411/82 |
| 5,934,729 | A | | 8/1999 | Baack |
| 6,308,476 | B1 | | 10/2001 | Nakamoto et al. |
| 6,374,455 | B1 | * | 4/2002 | Regele et al. ................. 16/2.1 |
| 6,394,537 | B1 | | 5/2002 | DeRees |
| 6,435,298 | B1 | | 8/2002 | Mizuno et al. |
| 6,533,487 | B2 | | 3/2003 | Clark |
| 6,694,566 | B1 | * | 2/2004 | Mockett ......................... 16/2.1 |
| 6,715,812 | B2 | | 4/2004 | Sakuma et al. |
| 6,722,730 | B2 | | 4/2004 | Lydan et al. |
| 6,726,273 | B2 | | 4/2004 | Kruschhausen et al. |
| 6,729,822 | B2 | * | 5/2004 | Sbongk ......................... 411/433 |
| 6,824,203 | B2 | | 11/2004 | Kanie |
| 7,036,875 | B2 | | 5/2006 | Kanie |
| 2005/0008458 | A1 | * | 1/2005 | Keech et al. ................. 411/555 |

FOREIGN PATENT DOCUMENTS

| | | |
|---|---|---|
| DE | 19944685 | 3/2001 |
| EP | 1612432 | 1/2006 |
| JP | 59-129676 | 8/1984 |
| JP | 62-59311 | 4/1987 |
| JP | 62073109 U | 5/1987 |
| JP | 7-41035 | 7/1995 |
| JP | 8-1091 | 7/1996 |

* cited by examiner

FASTENERS FOR CLAMPING SHEET-FORM MEMBERS, AND APPARATUS AND METHOD USING SUCH FASTENERS TO ATTACH UNDERCOVER ONTO UNDERSIDE OF VEHICLE FLOOR PANEL

CROSS-REFERENCE TO RELATED APPLICATION

This application claims the benefit of Japanese Patent Application No. 2006-118725 filed Apr. 24, 2006, incorporated herein by reference.

BACKGROUND OF THE INVENTION

This invention relates to fasteners for clamping sheet-form members. More particularly, the invention relates to an apparatus and method for attaching an undercover onto the underside of a vehicle floor panel, in which such fasteners are inserted in mounting holes in the undercover and receive studs attached to the floor panel.

The use of fasteners for attaching a sheet-form member, such as an undercover, to a support, such as a vehicle body panel, is known. For example, studs welded to the body panel may be inserted in mounting holes in the undercover, which is secured to the body panel by threading nuts onto the studs. The studs are attached to the body panel at prescribed intervals and positions, but a certain range of allowable error in the positioning of the studs is allowed. In Japanese Unexamined Utility Model Application No. S62-73109/1987 (Gazette), a member to be mounted is not specified as being an undercover, but apparatus is described in which fasteners are secured to the member and are fastened to studs of a support, such as a panel to which the studs have been secured. Such apparatus can be used for attaching an undercover to a panel to which studs have been secured, but no consideration is given to the allowable error referred to above.

When nuts are tightly screwed onto studs to attach an undercover to a body panel, tightening stress is concentrated in the undercover at the fastening positions. Undercovers made of plastic are placed in a high-temperature environment, heated when the vehicle engine is running, cooled when the engine stops running, and are expanded and contracted by temperature changes.

When the undercover is strongly fastened by nuts screwed onto studs, there is a danger of plastic deformation of the undercover at the fastening positions. It is desirable to maintain secure attachment for the undercover and yet to accommodate expansion and contraction in the plane of the undercover due to temperature changes, so as to prevent deformation.

U.S. Pat. Nos. 6,824,203 and 7,036,875, both incorporated herein by reference, disclose an apparatus and method for attaching an undercover onto the underside of a vehicle floor panel in a simple manner that allows movement of the undercover along the plane of the undercover, in the direction of expansion and contraction, to accommodate temperature changes, while preventing play in the direction of a stud axis, to maintain secure attachment of the undercover to the floor panel. Tubular fasteners are used that comprise first and second clips with flanges for clamping the undercover between them with a prescribed clamping force. The tubular fasteners are inserted in mounting holes of the undercover with diametral clearance, and the prescribed clamping force allows movement of the undercover in the planar direction but prevents movement perpendicular to the planar direction.

While the inventions disclosed in the aforesaid U.S. patents provide a solution to the plastic deformation problem, there is the potential for loosening of the connection of the fasteners to the studs due to unintended turning of a first clip of a fastener relative to a second clip of the fastener, caused by vibration, for example.

BRIEF DESCRIPTION OF THE INVENTION

The present invention provides improved clamping fasteners, and provides improved apparatus and methods using such fasteners for attaching an undercover to an underside of a vehicle floor panel, for example.

In one non-limiting embodiment of the invention, a fastener for clamping a sheet-form member comprises first and second tubular clips with flanges that clamp the sheet-form member between them. The first clip has a tube that is inserted into a mounting hole of the sheet-form member and into a tube of the second clip. The tubes have cooperable coupling members for coupling them to one another. The tube of the first clip has engagement means therein for engaging a stud inserted into the tube.

One side of the flange of the first clip has a configuration that cooperates with a configuration on an opposing side of the sheet-form member to prevent undesired turning of the first clip relative to the second clip about a common clip axis. The flange of the first clip may also be constructed to facilitate intentional turning of the first clip relative to the second clip for tightening or loosening the engagement of the engagement means with the stud.

Fasteners of the invention may be pre-attached to an undercover by inserting the tube of the first clip into a mounting hole in the undercover and into the tube of the second clip so that the clip flanges clamp the undercover between them. By providing diametral clearance between mounting holes and inserted tubes, planar movement of the undercover relative to the fasteners can be achieved to avoid plastic deformation of the undercover. Some of the mounting holes can be elongated in a predetermined direction to provide stud pitch correction in that direction.

BRIEF DESCRIPTION OF THE DRAWINGS

The invention will be further described in conjunction with the accompanying drawings illustrating preferred (best mode) embodiments, and wherein:

FIG. 13(B) is a diagram showing a projection and a secondary reference mounting hole in a sheet-form member.

FIG. 14(B) is a diagram showing a projection and a secondary reference mounting hole in a sheet-form member, and channels in a first clip flange.

DETAILED DESCRIPTION OF THE INVENTION

An embodiment of the present invention will now be described with reference to the drawings.

Figure 11:
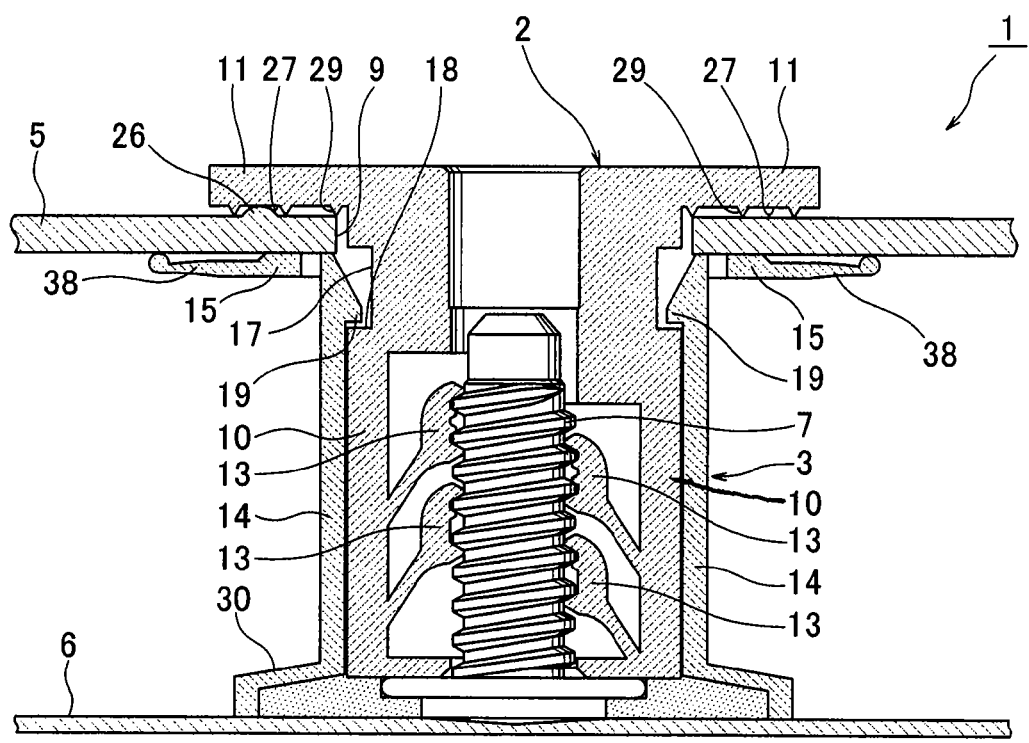
FIG. 11 is a section that shows how a sheet-form member is attached to a stud-equipped support, using a fastener relating to one embodiment of the present invention.

In FIG. 11, a fastener 1 of the invention, comprising a first clip 2 and a second clip 3, is shown as used for mounting a sheet-form member such as an undercover 5 on a support such as a vehicle floor panel 6 having a stud 7 projecting therefrom. A cylindrical tube 10 of the first clip 2 is shown inserted in a mounting hole 9 in the undercover 5 and into a cylindrical tube 14 of the second clip 3. The clips are coupled to one another, in a manner to be described, and respective flanges 11 and 15 of the clips clamp the undercover 5 between them. In the tube 10 engagement means 13 engage the stud and hold it in the tube. Each clip is preferably a unitary structure made of hard molded plastic (synthetic resin).

The first and second clips 2 and 3 will now be described in detail. As shown in FIGS. 1-6, the first clip 2 comprises the flange 11 with the cylindrical tube 10 extending from one side of the flange 11. As shown in FIGS. 7-10, the second clip 3 comprises the flange 15 with the cylindrical tube 14 extending from one side of the flange 15.

Figure 2:
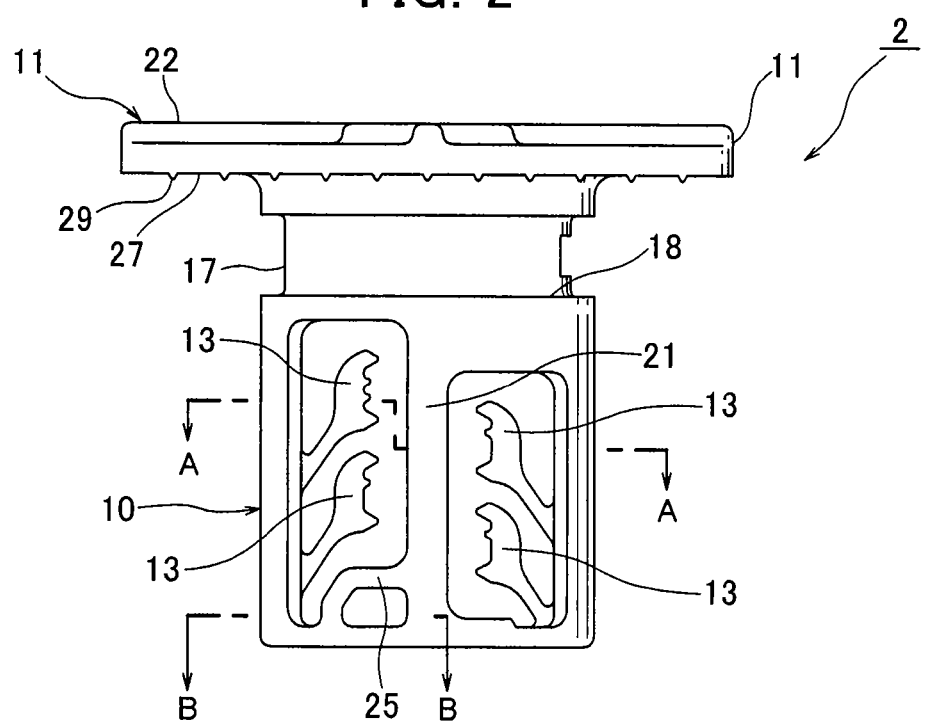
FIG. 2 is a front elevation of the first clip shown in FIG. 1.
Figure 3:
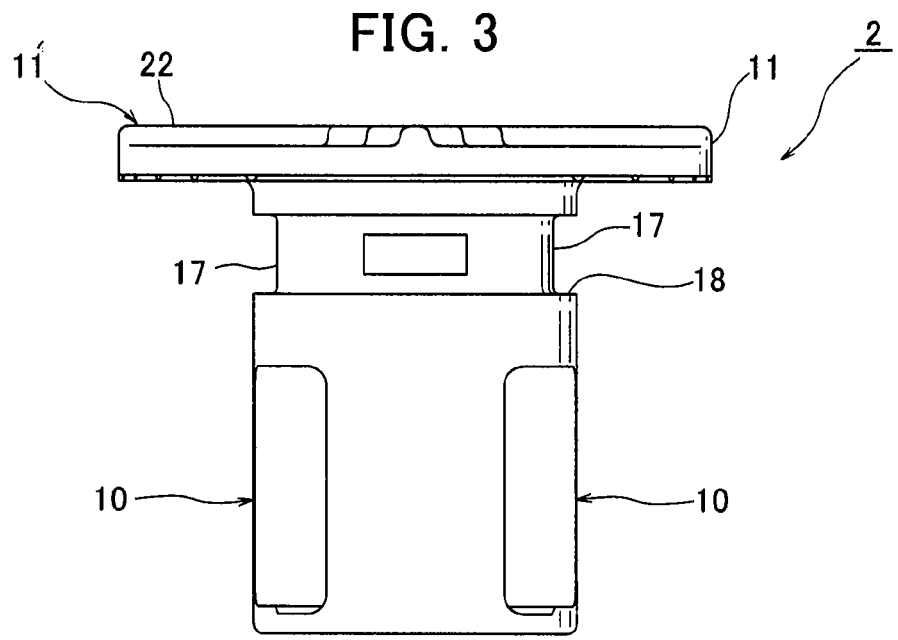
FIG. 3 is a right side elevation of the first clip shown in FIG. 2.
Figure 7:
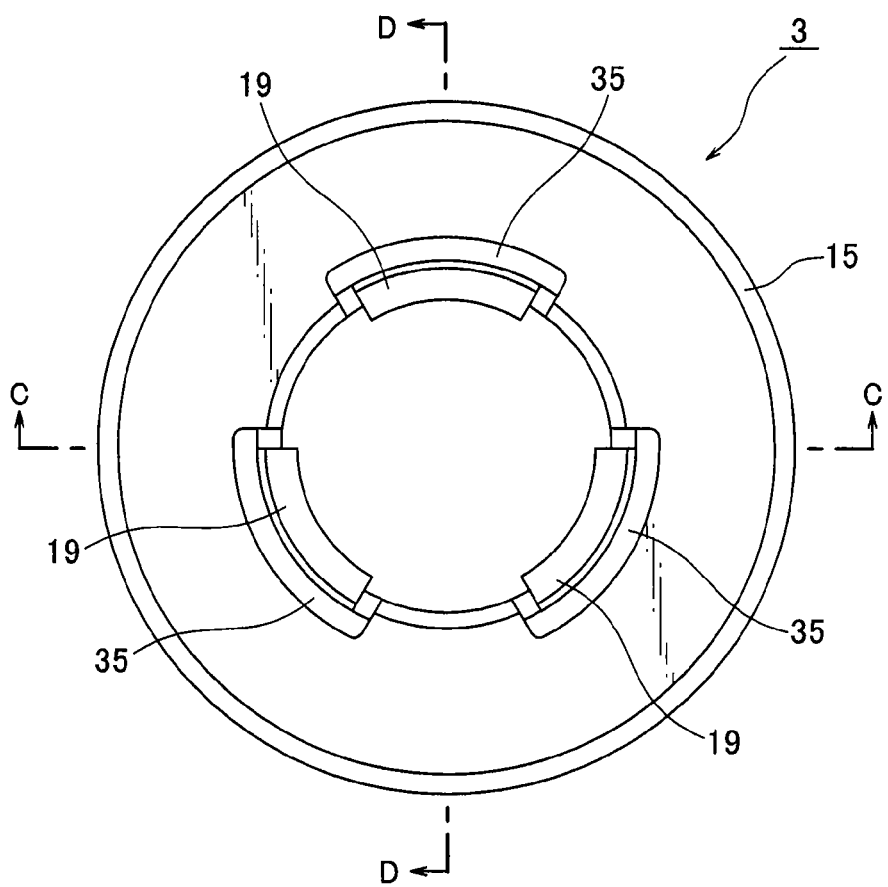
FIG. 7 is a plan view of a second clip for a fastener relating to one embodiment of the present invention.
Figure 8:
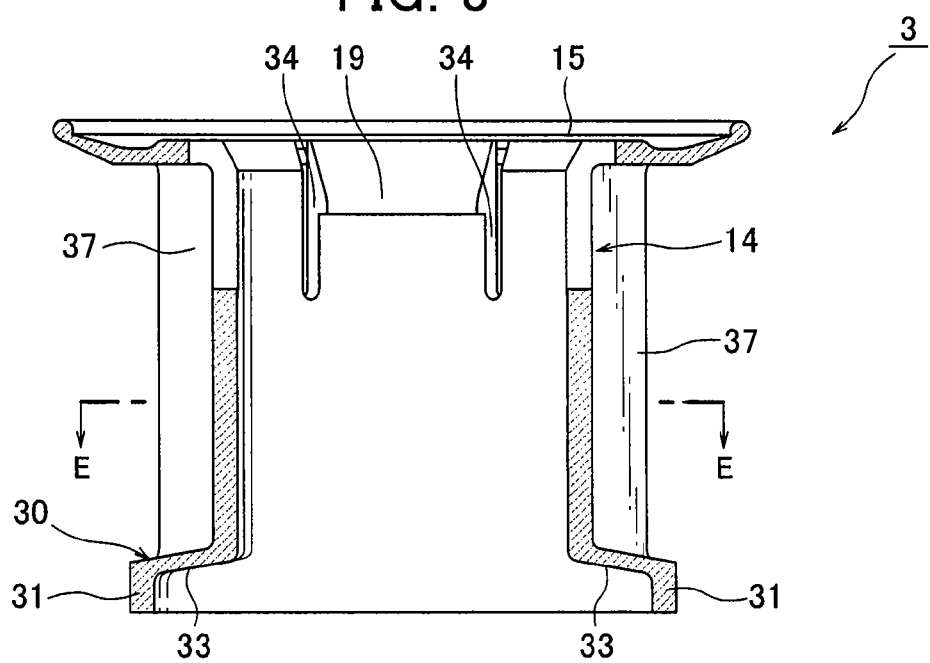
FIG. 8 is a section at the C-C line of the second clip shown in FIG. 7.
Figure 9:
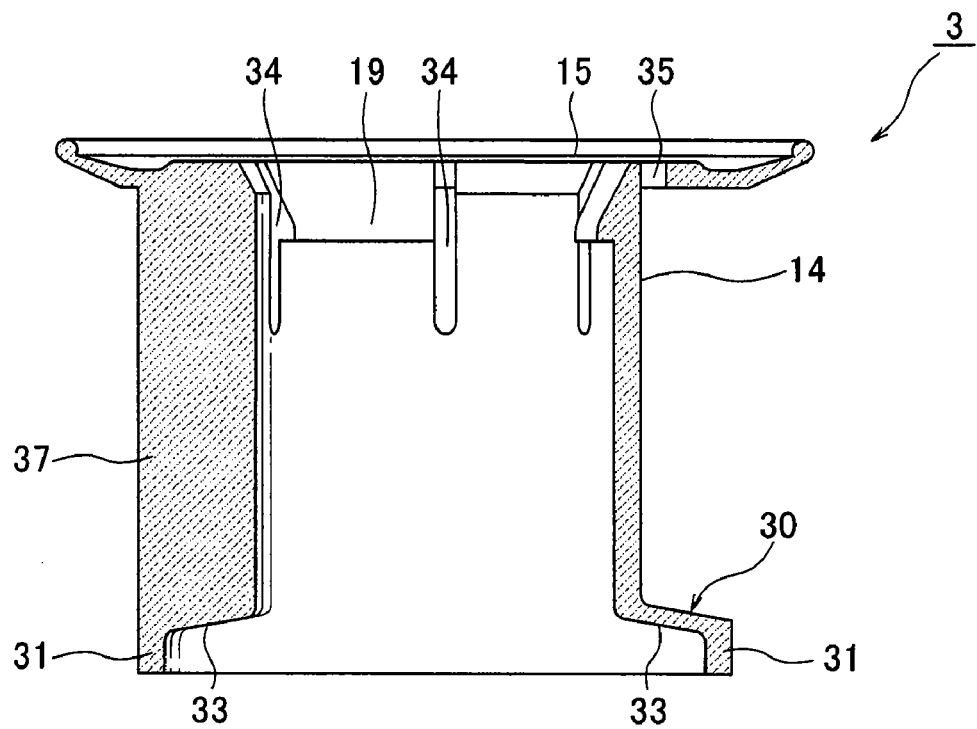
FIG. 9 is a section at the D-D line of the second clip shown in FIG. 7.

As mentioned above, the clips 2 and 3 have cooperable coupling elements for coupling the clips to one another, as later explained. One of the coupling elements, on clip 2, comprises a groove or neck 17 (circumferential in the embodiment) and the shoulder 18, as shown in FIG. 2. The other coupling element, on clip 3, comprises a plurality of resilient latches 19 supported on the tube 14 of the second clip 3 and defined by slits 34 in the wall of the tube 14, and a slit 35 in the flange 15, as shown in FIGS. 7-9.

The first clip 2 has engagement means 13 for engaging and holding a stud inserted in the tube 10. In the embodiment, the engagement means is comprised of a plurality of resilient pawls extending at an angle from the inner wall of the tube 10, but other types of engagement means may be used.

Figure 4:
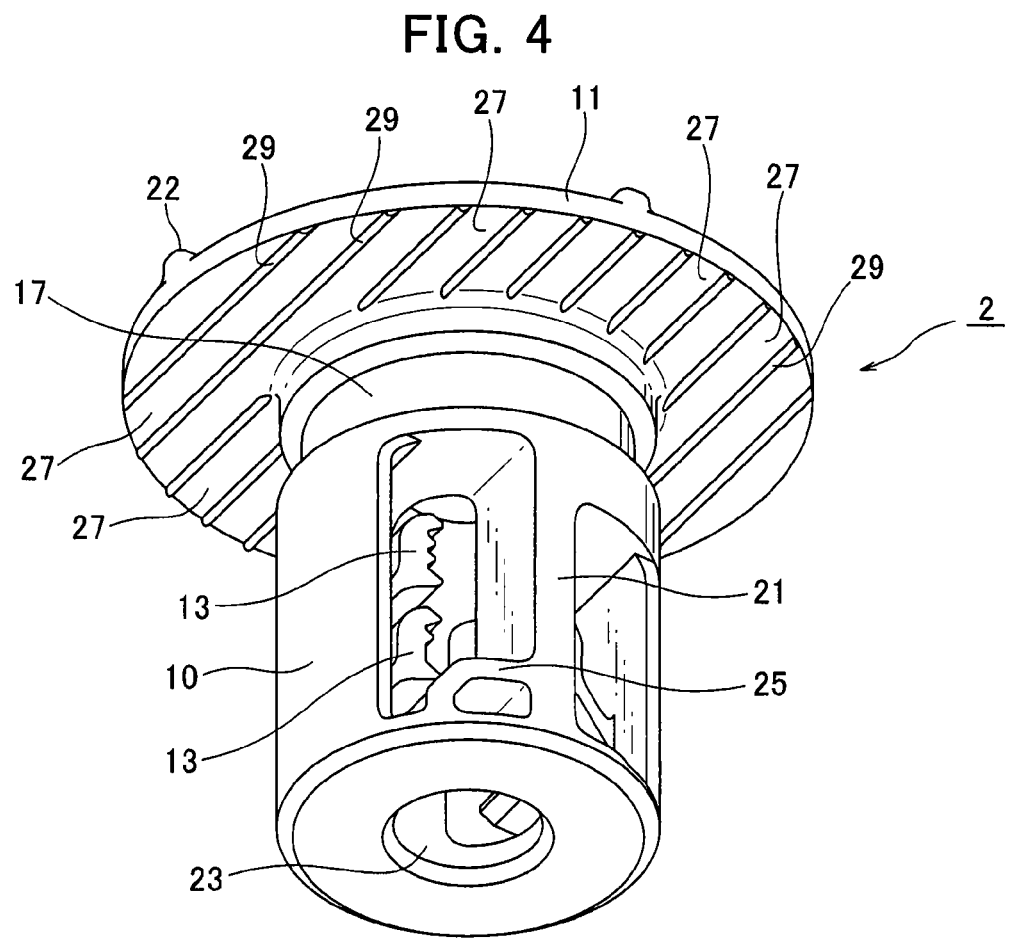
FIG. 4 is a perspective view of the first clip shown in FIG. 2 as seen from the bottom.
Figure 5:
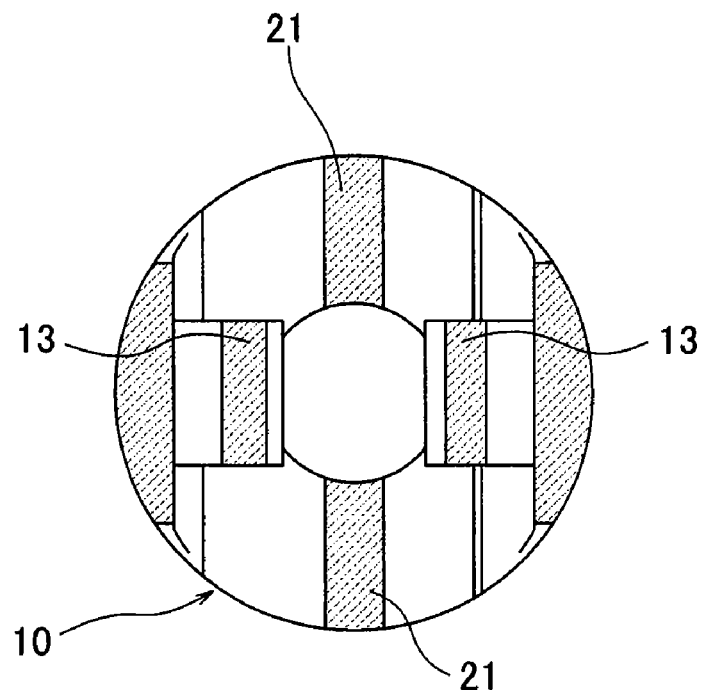
FIG. 5 is a section at the A-A line of the first clip shown in FIG. 2.
Figure 6:
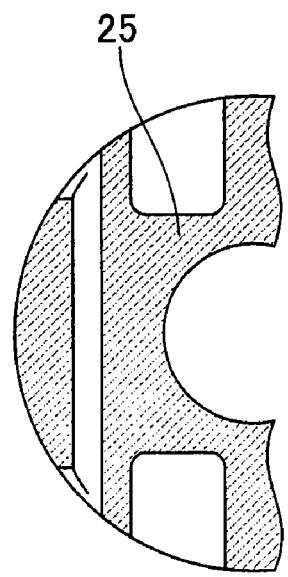
FIG. 6 is a section at the B-B line of the first clip shown in FIG. 2.

As shown in FIGS. 2, 4, and 5, the tube 10 of the first clip 2 is provided with a plurality of longitudinal ribs 21 for centering a stud therein. The tube 10 is open at the end thereof remote from the flange 11 for receiving a stud in a hole 23 (see FIG. 4) and is provided with a frame 25, as shown in FIGS. 2, 4, and 6, that cooperates with ribs 21 to define a stud-receiving passage in tube 10.

In clip 2 of the embodiment, a first side of the flange 11 has a configuration comprising a plurality of parallel channels 27 defined by walls 29 (FIG. 4), which cooperates with a configuration on one side of a sheet-form member, as later described. The purpose of these configurations is to prevent unintentional turning of the first clip 2 with respect to the second clip 3 about a common axis of the clips after the clips have been coupled to one another.

Figure 1:
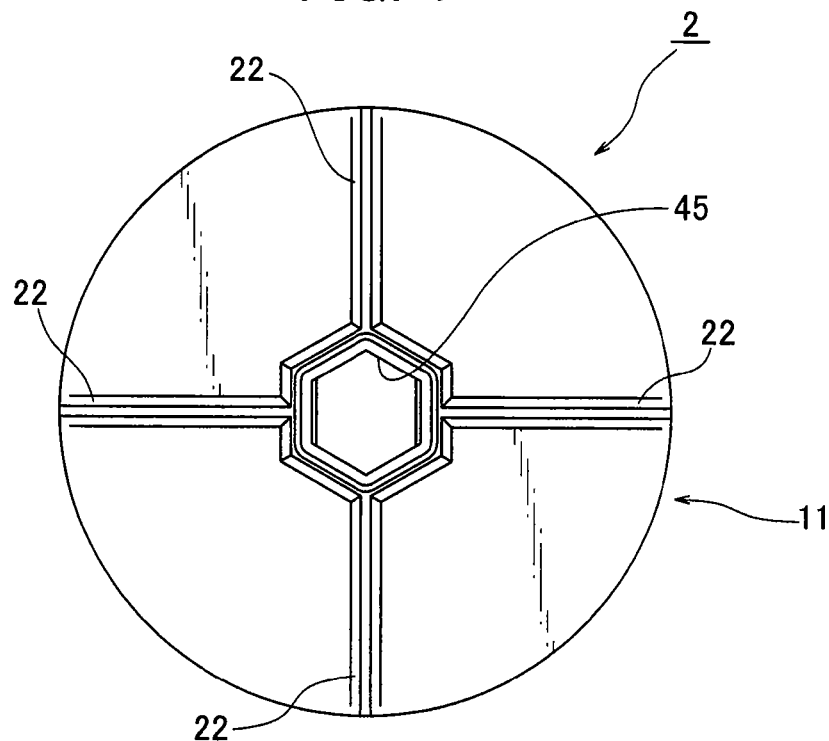
FIG. 1 is a plan view of a first clip for a fastener relating to one embodiment of the present invention.

A second side of the flange 11 has a plurality of ridges 22 arranged in a cross-shaped pattern, as shown in FIG. 1. These ridges and a polygonal opening 45 in the flange facilitate intentional turning of the clip 2 relative to the clip 3.

As shown in FIGS. 8 and 9, the flange 15 of clip 3 terminates one end of the tube 14. A flange 30 terminates the opposite end of the tube 14 and includes a cylindrical portion 31 and a conical portion 33.

Figure 10:
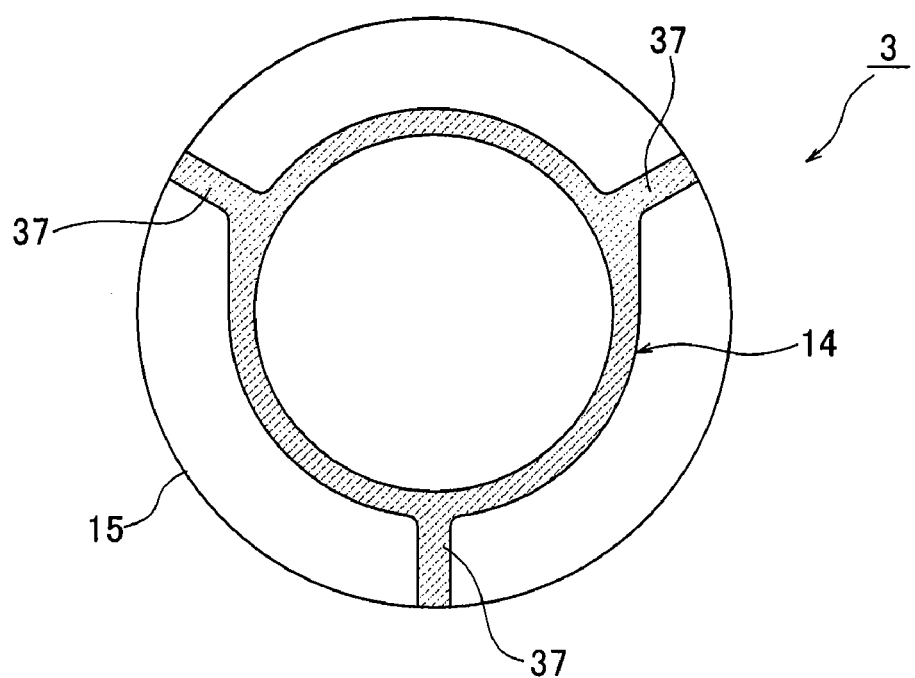
FIG. 10 is a section at the E-E line of the second clip shown in FIG. 8.

Projecting radially outward from the tube 14 are a plurality of longitudinal stiffening ribs 37 extending from the flange 15 to the flange 30, as shown in FIGS. 8-10. The ribs 37 increase the strength of clip 3.

The clips 2 and 3 are structured so that the tube 10 of the first clip can be inserted into the tube 14 of the second clip and held therein by the cooperable coupling elements 17-18 and 19, with the flanges 11 and 15 spaced a predetermined distance apart to clamp a sheet-form member 5 between them, as shown in FIG. 11.

The sheet-form member 5 may be an undercover for attachment to a floor panel 6 of a vehicle. The floor panel 6 is provided with a plurality of studs 7 at predetermined positions and spacings, and the undercover 5 is provided with corresponding mounting holes 9.

Fasteners 1 are provided for corresponding mounting holes 9 and can be pre-attached to the undercover 5 before the fasteners are associated with the studs 7. For this purpose, a tube 10 of each clip 2 is inserted in a hole 9 and into a tube 14 of a second clip 3. In the course of this insertion, the outer surface of the tube 10 slides along tapered surfaces of the latches 19, resiliently flexing the latches outward until they snap into the groove 17, as shown in FIG. 11, whereupon the clips 2 and 3 are coupled to one another.

When the fasteners 1 are attached to a sheet-form member 5, as just described, the walls 29 of the grooves 27 engage one side of the sheet-form member. Resilient outer portions 38 of the flange 15 engage the opposite side of the sheet-form member.

When the sheet form member 5 is an undercover, it is mounted on a floor panel 6 of a vehicle by pressing each fastener 1 onto a corresponding stud 7 projecting from the floor panel. Each stud is inserted into the tube 10 of a clip 2, where it engages the resilient pawls 13, which flex outwardly. In the form shown the stud 7 is a threaded stud, and surfaces of the pawls 13 facing the stud engage the threads in a mating relationship, but the stud may have circumferential grooves engaged by appropriate pawl surfaces. In the embodiment, the pawls 13 are staggered along the length of the stud and converge toward the stud.

In accordance with the principles described in the aforesaid U.S. patents, it is desired that the fastening arrangement accommodate temperature changes in a manner that prevents or minimizes plastic deformation of the undercover 5 around the fasteners. For this purpose, the dimensional relationship between clips 2 and corresponding circular mounting holes 9 is such as to provide diametral clearance between the portion of a tube 10 within a hole 9 and the wall of the hole, so that planar movement of the undercover 5 with respect to the fasteners 1 can occur. One or more circular reference holes may be provided in the undercover, in which the diameter of the reference holes matches the diameter of the tubes 10 within those holes. Furthermore, one or more holes may be elongated in a longitudinal direction of the undercover 5 to provide for pitch correction, in a manner described later.

As described in the aforesaid U.S. patents, the clamping force by which the flanges 11 and 15 clamp the undercover 5 is made sufficient to prevent undesired loosening of the connection to the studs, but yet to permit planar movement of the undercover. In accordance with the present invention, undesired turning of a clip 2 with respect to a clip 3 about a common axis of the clips (the axis of a stud), which would loosen a connection between the fasteners and the studs, is to be prevented.

In an embodiment of the present invention, the surface of the undercover 5 facing the flanges 11 is provided with projections 26 that enter one of the channels 27 to prevent undesired turning movement. Nevertheless, a worker can intentionally turn a clip 2 with respect to a clip 3 by applying sufficient torque to a flange 11 to force a projection 26 out of a groove 27. Ridges 22 on the flange 11 (FIG. 1) can be engaged by a worker's fingers to create the desired torque, or a tool such as an Allen wrench can be engaged with a hexagonal opening 45 (or other non-circular opening or protrusion) to create such torque. Turning movement may be required to place a projection 26 in a groove 27 after the clips are coupled to one another and/or to tighten or loosen a connection between a fastener and a corresponding stud. The height and shape of the walls 29 are formed so as to make it possible for a worker to turn a flange 11 of a first clip 2 in order to separate pawls 13 from a screw stud and remove the first clip 2 from the stud.

Figure 12:
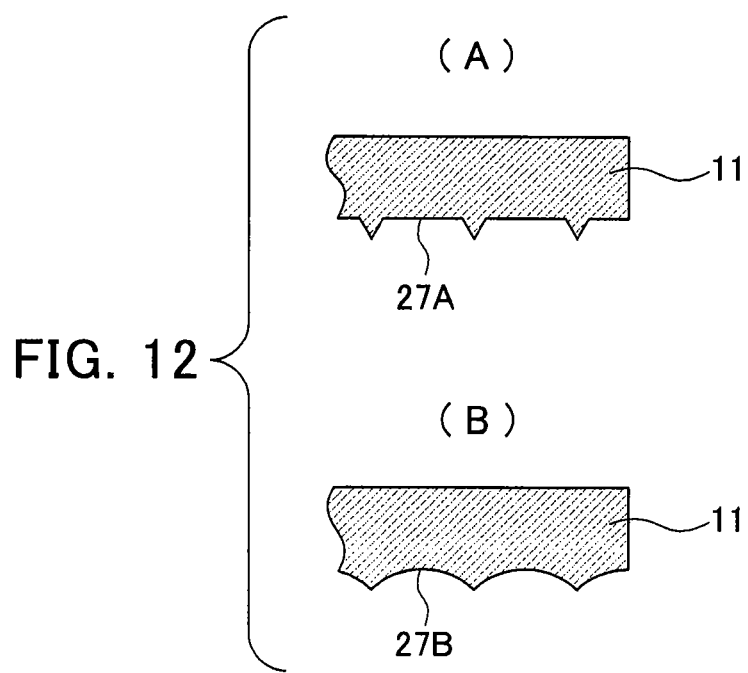
FIGS. 12 (A) and (B) are sections showing example modifications of the channels in the first clip flange.

FIG. 12 shows different cross-sectional configurations of channels 27A and 27B which may be used, but other configurations are also usable. The cross-sectional shape of the channels 27 should be appropriate for the shape of the projections 26.

Figure 13:
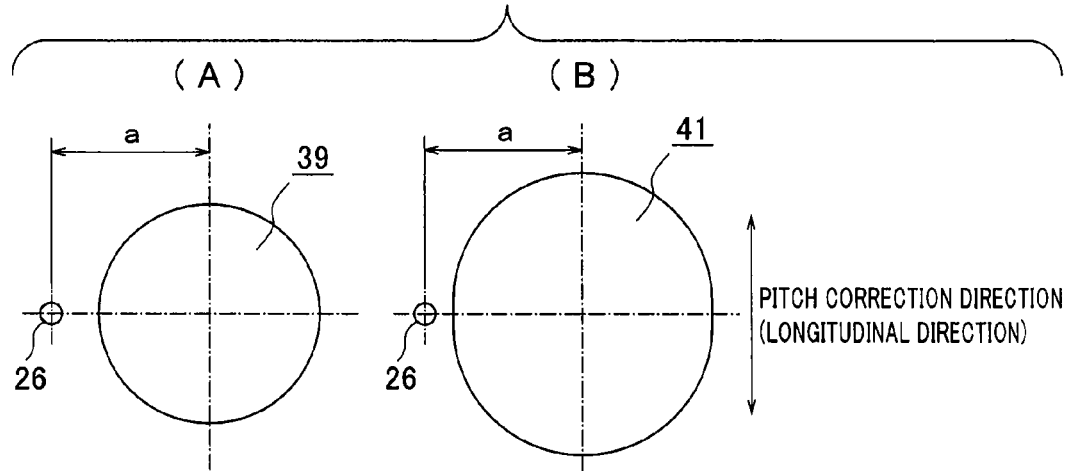
FIG. 13 (A) is a diagram showing a projection and a reference mounting hole in a sheet-form member.
Figure 14:
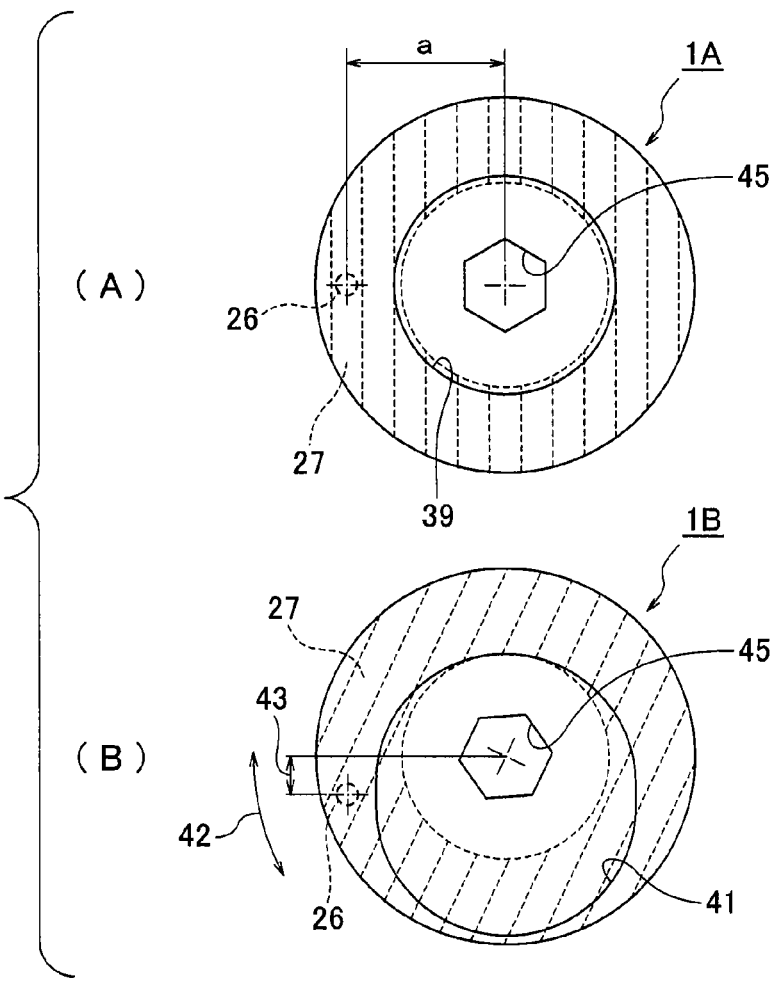
FIG. 14 (A) is a diagram showing a projection and a reference mounting hole in a sheet-form member, and channels in a first clip flange.

The manner in which pitch correction can be achieved will now be described with respect to FIGS. 13-15.

In order to secure a sheet-form member, such as an undercover 5, to a support, such as a floor panel 6 of a vehicle, it is necessary to absorb any pitch error in the spacing of a plurality of studs. On the panel 6, a first stud and a second stud are secured at prescribed intervals with prescribed positioning. In the undercover 5, corresponding thereto, one substantially circular reference mounting hole is formed at a position corresponding to the first stud, and one secondary reference mounting hole (or a plurality thereof) is formed as an elongated or oblong reference mounting hole at a position (or positions) corresponding to a second stud (or studs).

A reference mounting hole 39 is shown in FIG. 13(A), and a secondary reference mounting hole 41 is shown in FIG. 13(B). As shown, on the undercover 5, a first projection 26 is formed at a position adjacent to the reference mounting hole 39 at a prescribed distance "a" from the center of that hole. Whether for a reference mounting hole or for a secondary reference mounting hole, the position of the projection 26 is at a prescribed distance "a" from the center of the hole.

As shown in FIG. 14(A), a first fastener 1A is attached to the reference mounting hole 39, and as shown in FIG. 14(B), a second fastener 1B is attached to the secondary reference mounting hole 41. Next the first fastener 1A is fastened to a stud, and the second fastener 1B is attached to a second stud.

When securing the fasteners 1A and 1B to the first stud and the second stud, the error in the positioning and interval of the second stud to which the second fastener 1B is fastened, referenced to the first stud to which the first fastener 1A is fastened, can be absorbed by the elongated secondary reference mounting hole.

Figure 15:
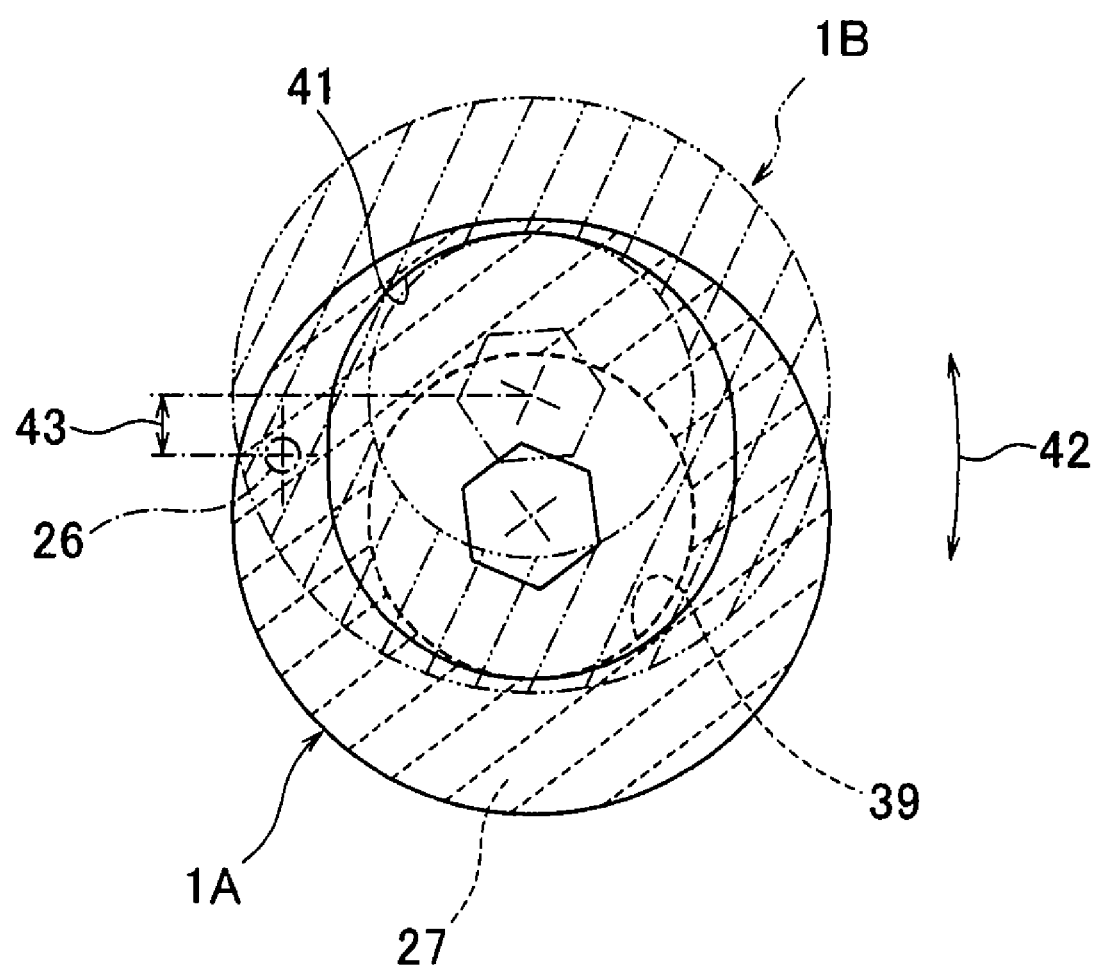
FIG. 15 is a diagram showing how pitch is absorbed when the reference mounting hole and secondary reference mounting hole diagrammed in FIG. 14 are superimposed.

FIGS. 14(B) and 15 depict how the pitch error of the second fastener 1B and the secondary reference mounting hole 41 is absorbed. In FIGS. 14(B) and 15, when the second fastener 1B is displaced from the center of the hole, in the secondary reference mounting hole 41, the projection 26 accommodated in the channel 27 engages the walls thereof and turns the second fastener 1B through a small angle (arrow 42), and the condition of the projection 26 being accommodated in the channel 27 is maintained. In this way, a channel 27 of the first clip flange of the first fastener 1A accommodates the projection 26, and a channel 27 of the first clip flange of the second fastener 1B also accommodates the projection 26, so that in both fasteners the first clip 2 is prevented from turning about the common clip axis. Accordingly, the undercover can be attached to the floor panel so as to cope with attachment to studs exhibiting allowable error.

The pitch error 43 shown in FIG. 14(B) and FIG. 15, for example, is absorbed. In such cases also, turning of the fasteners is checked, so that the advantages of the invention are preserved, namely, after attachment, the undercover is prevented from undesired disconnection from the floor panel, the ease of attaching the undercover to the floor panel is preserved, and movement in the direction of the plane of expansion and contraction due to temperature changes in the undercover is made possible.

While preferred embodiments of the invention have been shown and described, changes can be made without departing from the principles and spirit of the invention, the scope of which is defined in the accompanying claims. For example, while the invention has been described in its application to attachment of an undercover to a floor panel provided with a plurality of studs, the invention is useful in other applications where it is desired to use the fasteners of the invention to clamp a member between first and second clip flanges, irrespective of whether or not studs are present.

What is claimed is:

1. An apparatus comprising:
an undercover;
a floor panel; and
fasteners;
wherein studs are fixed at predetermined positions on an underside of the floor panel, mounting holes formed in the undercover receive corresponding studs therein, and the fasteners are inserted in respective mounting holes and engage corresponding studs therein,
wherein each fastener comprises:
a first clip having a first flange with a first tube extending from a first side of the first flange; and
a second clip having a second flange with a second tube extending from a first side of the second flange,
wherein the clips are constructed so that the first tube can be inserted into the second tube along a common axis,
wherein the tubes have cooperable first and second coupling elements, respectively, for coupling the inserted first tube to the second tube, with the first flange opposed to the second flange with a space between the flanges for receiving the undercover, with the first side of the first flange disposed to engage a first side of the undercover, and with a second side of the second flange disposed to engage a second side of the undercover,
wherein the first tube is inserted in a mounting hole of the undercover and into the second tube, and the second tube terminates at the second flange,
wherein the first and second flanges clamp the undercover between them with a predetermined clamping force,
wherein at least some of the mounting holes of the undercover have a diameter substantially larger than the outer diameter of a first tube therein,
wherein the clamping force prevents substantial movement of the undercover in the direction of the common axis, but permits planar movement of the undercover perpendicular to the direction of the common axis, wherein at least one mounting hole is a reference hole having a diameter substantially the same as the outer diameter of a first tube in the reference hole, and wherein at least one mounting hole is a secondary reference hole elongated in a predetermined direction.

2. The apparatus of claim 1, wherein the first side of the first flange has a configuration that cooperates with a configuration on the first side of the undercover to restrict relative turning movement of the first clip and the second clip about the common axis.

3. The apparatus according to claim 2, wherein the configuration on the first side of the first flange comprises a channel and the configuration on the first side of the undercover comprises a projection received in the channel.

4. The apparatus according to claim 3, wherein the configuration on the first side of the first flange comprises parallel channels.

5. The apparatus according to claim 1, wherein the first flange has a configuration that facilitates intentional turning of the first flange about the common axis.

6. The apparatus according to claim 5, wherein the configuration that facilitates turning of the first flange comprises ridges on the second side of the first flange.

7. The apparatus according to claim 5, wherein the configuration that facilitates turning of the first flange comprises a non-circular hole or protrusion shaped to engage a turning tool.

* * * * *